United States Patent Office 3,440,182
Patented Apr. 22, 1969

3,440,182
COPPER/VANADIUM OXIDE COMPOSITIONS, NOBLE METAL METALIZING COMPOSITIONS CONTAINING VANADIUM OXIDE ADDITIVES, AND ELECTRICAL CONDUCTOR ELEMENTS MADE THEREWITH
Lewis C. Hoffman, Wilmington, Del., assignor to E. I. du Pont de Nemours and Company, Wilmington, Del., a corporation of Delaware
No Drawing. Continuation-in-part of application Ser. No. 475,846, July 29, 1965. This application Oct. 10, 1966, Ser. No. 585,246
Int. Cl. H01b 1/02, 5/14
U.S. Cl. 252—514    14 Claims

ABSTRACT OF THE DISCLOSURE

Noble metal metalizing compositions comprising (a) a noble metal powder, (b) an inorganic binder powder and (c) a $V_2O_5$ additive powder to improve the solderability, conductivity and/or adhesion properties of fired metalizings thereof on ceramic substrates, components (a), (b) and (c) being present in specified proportions; also, electrical conductor elements made using such compositions. The $V_2O_5$ additive may be a copper/vanadium oxide composition containing $Cu_2O$ and $V_2O_5$ in specified proportions, which oxide composition is preferably in a fusion-reacted form. Such copper/vanadium oxide composition may also serve as the inorganic binder in the metalizing composition, although its use in physical admixture with a glass powder is preferred. When $V_2O_5$ per se is used as the additive, it should be employed in admixture with a glass powder.

Cross-reference to related application

This application is a continuation-in-part of my copending application Ser. No. 475,846, filed July 29, 1965.

Background of the invention

Metalizing compositions comprising a noble metal powder and an inorganic binder have long been known and used in preparing fired-on electrical resistor or conductor elements for electronic circuits. When intended for use in preparing conductor elements, the prime purpose of the inorganic binder in the noble metal conductor composition is to bond the metal component firmly to the ceramic substrate, e.g., alumina, barium titanate, steatite or the like, upon which the composition is applied and fired. For application to such substrates, the metal and binder powders are generally dispersed in an inert liquid vehicle, usually organic, to form a metalizing link, paint or paste, which is applied to the substrate in the desired pattern, e.g., by the screen-stencil method.

Requirements for such conductor compositions are that they yield fired-on coatings (metalizings) which adhere well to the substrate and are highly conductive. Furthermore, since the metalizings made by their use generally require soldering, it is also important that the compositions give metalizings which can be readily soldered.

Knox (U.S. Patent 2,385,580) found that combinations of $Bi_2O_3$ in relatively high proportions with lead borosilicate glasses give excellent binders for silver compositions, and silver compositions containing the Knox type binders have been widely used. However, the Knox type binders are far from being ideal for use in compositions comprising other noble metals, particularly platinum and gold and palladium and gold, because adhesion of such compositions to ceramic substrates is quite poor. Thus, there is need for noble metal metalizing compositions, particularly those of noble metals other than silver which will yield metalizings having improved properties respecting adherence to the substrate and will also have good conductance and solderability.

Description of the invention

It has been discovered that vanadium oxide, $V_2O_5$, when used as an additive to noble metal metalizing compositions in relatively small amounts, improves substantially the solderability, conductivity and/or adhesion properties of the metalizings resulting when such compositions, including the additive, are applied to and fired on ceramic substrates. The beneficial effects of the $V_2O_5$ additive may be realized by employing $V_2O_5$ (or a precursor thereof such as ammonium vanadate which will yield $V_2O_5$ when the metalizing composition is fired on a ceramic substrate) alone, in which case, the metalizing composition should also include a glass powder. The $V_2O_5$ additive can also advantageously be employed as a copper/vanadium oxide composition, which may be a physical mixture of $Cu_2O$ and $V_2O_5$ but is preferably a fusion-reacted mixture thereof. When such a copper/vanadium oxide composition is employed as the additive, the presence in the metalizing composition of a glass powder component is not essential but is preferred.

The copper/vanadium oxide compositions which are usable in accordance with the invention contain copper and vanadium oxides in the proportions, calculated as $Cu_2O$ and $V_2O_5$, of 40 to 75% and 60 to 25%, respectively, by weight. While such compositions may be employed in the form of physical mixtures of $Cu_2O$ and $V_2O_5$ powders, it is distinctly advantageous and preferable to employ preheated mixtures of the two oxides (or of precursor compounds thereof which yield such oxides under the heating conditions to be described in the proportions indicated above, i.e., mixtures which have been heated and melted at a temperature from 1000 to 1400° C. in a fireclay, porcelain, kyanite, alumina, platinum or other suitable crucible. The melt, which is held at that temperature only so long, e.g., 2 to 10 minutes, as to insure homogeneity, is then cooled, e.g., by pouring onto a steel plate. The resulting solid fragments of the oxide composition are crushed and ball-milled to a fine powder. The exact chemical composition of the fusion-reacted oxide compositions is not known but it obviously will vary as the starting proportions of $Cu_2O$ and $V_2O_5$ are varied. While it is thought that the fusion-reacted compositions consist chiefly of various reaction products composed principally of $Cu_2O$ and $V_2O_5$, there are indications that cupric copper (++) is present to some extent as are perhaps also various of the lower oxides of vanadium.

However, $Cu_2O$ and $V_2O_5$ appear to constitute the major constituents of the solidified (from the melt) reaction products which are definitely crystalline. They are not glassy or vitreous.

Whether the $V_2O_5$ additive be employed with $Cu_2O$, or in the absence of $Cu_2O$, the amount of $V_2O_5$ added to the metalizing composition should be sufficient to effect a significant improvement in the solderability, conductivity and/or adhesion properties of the final metalizing. When used in the absence of $Cu_2O$ but in the presence of a glass powder, an amount of $V_2O_5$ equal to at least 0.3%, based upon the combined weights of the noble metal and binder powder, will generally be required. The preferred amounts range from about 1 to 2%. Amounts greater than about 5% are generally undesirable and preferably are avoided. When the present copper-vanadium oxide compositions are used as the $V_2O_5$ additives, they can be employed alone as the inorganic binders in noble metal metalizing compositions, but they preferably are employed in admixture with glass powders.

Accordingly, the noble metal metalizing compositions of the invention, on a weight basis, comprise physical mixtures of (a) 60 to 95%, preferably 80 to 95%, noble metal powder, e.g., silver, gold, palladium, platinum, rhodium, osmium or indium, or mixtures or alloys of 2 or more such metals, and (b) 5 to 40%, preferably 5 to 20%, inorganic binder powder; which binder powder may be (c) solely a copper-vanadium oxide composition (preferably fusion-reacted) containing copper and vanadium oxides in amounts, calculated as $Cu_2O$ and $V_2O_5$, of from 40 to 75% and 60 to 25%, respectively, but preferably is (d) a physical mixture of said copper/vanadium oxide composition and a glass powder containing 30 to 70% of said oxide composition and 70 to 30% of a glass powder. Alternatively, the noble metal metalizing composition will comprise a physical mixture of (a) 60 to 95%, preferably 80 to 95%, of the noble metal powder, (b) 5 to 40%, preferably 5 to 20%, of an inorganic binder comprising a glass powder and (c) from 0.3 to 5%, preferably 1 to 2%, $V_2O_5$ based upon the combined weights of components (a) and (b), said $V_2O_5$ being employed in the absence of $Cu_2O$.

The conductor elements of the invention comprise a ceramic substrate upon which has been fired, generally in precise pattern, a layer of a metalizing composition as defined above. The conductor element may be the terminal part of a circuit to which an outside lead is to be connected, e.g., by soldering, or it may serve to connect other parts of an electronic circuit, or it may be an electrical capacitor.

The beneficial effects of the present $V_2O_5$ additives on the properties of the metalizing composition are believed to be due in large part to the excellent wetting and spreading properties of $V_2O_5$. Molten $V_2O_5$ wets ceramic surfaces, particularly alumina, readily and spreads rapidly thereon, as is apparent from the extremely low contact angle (essentially zero) of the melt with the ceramic surface and the rapid advance of the melt over the surface. Previously, bismuth oxide was regarded as the best spreading liquid on ceramic surfaces, and because of its wetting and spreading properties, large proportions thereof have been employed together with glass powders in silver compositions (Knox, U.S. Patent 2,385,580). Many fused oxides have been studied and it has been found that $V_2O_5$ exhibited a lower contact angle and a more rapid spreading rate on alumina than did any other oxides tried. $Bi_2O_3$ melts and forms a liquid exhibiting a contact angle of about 8–20°, which liquid advances on an alumina substrate at a rate of about 2 cm./min. at a temperature just above its melting point. In contrast, $V_2O_5$ melts and forms a liquid having a contact angle of 0–5°, which liquid advances at a rate of about 5 cm./min.

The desirable high wetting and spreading action is exhibited by $V_2O_5$ even when it is present in small amounts in the metalizing composition. Unfortunately, $V_2O_5$, by itself, makes a very poor binder for metalizing compositions because of its very poor cohesive strength. It has been found, however, that the addition of $Cu_2O$ or glass powder to $V_2O_5$ in the proportions indicated above results in compositions having excellent cohesive strength, when fired, which compositions readily wet ceramic substrates and serve admirably as inorganic binders for noble metal metalizing compositions.

Because of the high spreading rate of molten $V_2O_5$, excessive amounts thereof in the metalizing composition is undesirable since they cause the binder to spread over the metalizing and surrounding ceramic surface during firing, thereby making the metalizing nonsolderable. However, more $V_2O_5$ can be employed and is desirable, when used together with $Cu_2O$ than in the absence of $Cu_2O$. Thus, $Cu_2O/V_2O_5$ mixtures (preferably fusion-reacted) containing 40 to 75% $Cu_2O$ and 25 to 60% $V_2O_5$ serve, alone, as excellent binders; whereas in the absence of $Cu_2O$, the amount of $V_2O_5$ added to the metalizing composition should not exceed about 5% of the combined weights of the metal powder and the glass powder, the presence of the latter being essential when $Cu_2O$ is not present with the $V_2O_5$.

The glass to be used as inorganic binder powder component, either together with $V_2O_5$ when used in the absence of $Cu_2O$ or together with the present copper/vanadium oxide composition, can in general be any of the glasses previously proposed as binders or binder components in formulating noble metal metalizing compositions. Generally, the glass will be a borate glass, i.e., one in which $B_2O_3$ constitutes at least 50% of the weight of all glass-forming oxides present in the glass. Thus, the $B_2O_3$ content should be at least as great as the sum of the contents of all other glass-forming oxides such as $SiO_2$, $P_2O_5$, $GeO_2$, $As_2O_3$ or $Sb_2O_3$.

The glass may be $B_2O_3$ alone, or a metal borate such as: the alkali, the alkaline earth, and the alkali-alkaline earth borates; also, the lead borates, the bismuth borates, the lead-bismuth borates, and the alkali-alkaline earth-transition metal-lead-bismuth borates. The borosilicate glasses are suitable, examples of which are the lead borosilicate, the alkali borosilicate, the alkaline earth borosilicate, the alkali-alkaline earth borosilicate, and the lead-bismuth borosilicate glasses whose $B_2O_3$ contents are at least equal to and preferably are greater than their $SiO_2$ contents. Other suitable glasses are the alkali-alkaline earth-transition metal alumino borate and the borosilicate glasses which contain at least as much $B_2O_3$ as $SiO_2$.

In glasses containing PbO and/or $Bi_2O_3$, the $B_2O_3$ content may be as small as 1% of the glass weight, but in glasses not containing PbO and/or $Bi_2O_3$, the $B_2O_3$ content should generally be at least 8%, e.g., 8 to 75%. Such glasses with still higher $B_2O_3$ contents are of course suitable, and, as noted previously, $B_2O_3$ alone can be used as the glass.

The preferred glasses are the high density glasses of the above types which contain the oxides of heavy elements such as lead, bismuth, barium, lanthanum, tantalum, tungsten and thallium, illustrative of which are glasses 1 and 7 of Table 1. The most preferred of such high density glasses are those containing both PbO and $Bi_2O_3$, as illustrated by glass 1 of Table 1. The glasses of Table 1, whose compositions are given in weight percentages, are illustrative of the many glasses which have been used successfully together with the present copper vanadium oxide compositions, or with $V_2O_5$ in the absence of $Cu_2O$, in formulating binders for noble metal metalizing composition in accordance with the invention.

TABLE 1

| Glass No | (1) | (2) | (3) | (4) | (5) | (6) | (7) | (8) | (9) | (10) |
|---|---|---|---|---|---|---|---|---|---|---|
| $B_2O_3$ | 5 | 100 | 10.5 | 2.5 | 16.9 | 10 | 10 | 81 | 71 | 3.5 |
| $SiO_2$ | | | 9.9 | | 12.7 | | | | | 3.5 |
| $Bi_2O_3$ | 73 | | | | | | | | | 82 |
| PbO | 20 | | 79.6 | 97.5 | | | | | | 11 |
| $WO_3$ | 2 | | | | | | | | | |
| $Na_2O$ | | | | | 7.3 | | | 12 | 14 | |
| CdO | | | | | 63.1 | 90 | | | | |
| BaO | | | | | | | 90 | | | |
| CaO | | | | | | | 7 | | | |
| $TiO_2$ | | | | | | | | | 10 | |
| $Al_2O_3$ | | | | | | | | | 5 | |

Glasses in which $P_2O_5$ is the major glass former give much less satisfactory binders when mixed with the present $V_2O_5$ additives than do the glasses of Table 1, and glasses in which $SiO_2$ is the major glass former, are also inferior. The reason why such glasses are inferior and unsuitable for the present purposes is explainable from the order of events which occur on melting the binder mixture on the ceramic substrate. The $V_2O_5$ additive component of the binder mixture, on melting during firing, can and does displace a borate type glass from the alumina or similar ceramic substrate. Such displacement insures a thorough wetting of the substrate resulting in a firm bond upon cooling. On the other hand, a high silica glass is more tenaciously held by the substrate, hence, its displacement and, therefore, the wetting of the substrate, is more difficult to accomplish and less firm bonds result. However, it is important that the glass used as a binder component possess good cohesive or tensile strength. The borate glasses are outstanding in this respect. In contrast, the phosphate, sulfide, germanate and arsenate types of glasses are weak glasses, i.e., they possesses low cohesive or tensile strengths, and, therefore, are not suitable for the present purposes.

Copper/vanadium oxide compositions were prepared by heating various mixtures of $Cu_2O$ and $V_2O_5$ to give homogeneous melts, solidifying the melts by pouring onto a steel plate, and crushing and ball-milling the resulting solid fragments to fine powders. Each powder was then melted on an alumina substrate and the contact angle and rate of spreading were determined. Also, rods 3 inches long and 0.25 inch in diameter were cast from the melts and used in determining cohesive strengths by the well-known transverse strength test. The results are reported in Table 2.

TABLE 2

| Composition No. | Weight percent | | Contact angle, ° | Spreading rate, cm./min. | Cohesion, lbs./in.² | Excessive spreading |
|---|---|---|---|---|---|---|
| | $Cu_2O$ | $V_2O_5$ | | | | |
| 1 | 90 | 10 | 18 | 1 | 6,500 | No. |
| 2 | 75 | 25 | 10 | 1 | 5,800 | No. |
| 3 | 60 | 40 | 5 | 2 | 5,700 | No. |
| 4 | 54 | 46 | 4 | 3 | 5,500 | No. |
| 5 | 50 | 50 | 2 | 4 | 5,200 | No. |
| 6 | 40 | 60 | 0 | 5 | 3,800 | Borderline. |
| 8 | 25 | 75 | 0 | 5 | 2,100 | Do. |
| 7 | 10 | 90 | 0 | 6 | 1,200 | Yes. |

It will be noted from the tabulation that cohesion (tensile strength) decreases as the $V_2O_5$ content is increased. A cohesion value of 3,800 lbs./in.² at 60% $V_2O_5$ (and 40% $Cu_2O$) is about as low as can be tolerated. On the other hand, the wetting property, as indicated by the contact angle and the rate of spreading, suffers, as the $Cu_2O$ content is increased; at $Cu_2O$ contents as high as 75% and greater, wetting and spreading are insufficient to give firm bonding of the metal coating to the substrate. But at $Cu_2O$ contents of below about 40%, i.e., at $V_2O_5$ contents above about 60%, excessive spreading on the substrate becomes noticeable in "halos" around the coatings or prints after firing on the substrate. Thus, it will be seen from the above data that the compositions possessing practical utility as binders are those containing from about 40 to 75% $Cu_2O$ and 60 to 25% $V_2O_5$, by weight, while composition 4 containing 54% $Cu_2O$ and 46% $V_2O_5$ represents an approximately optimum balance of properties respecting wetting, spreading and cohesive strength.

In preparing the copper/vanadium oxide compositions, either as simple physical mixtures of the starting copper and vanadium compounds, or as the preferred fusion-reacted product, the starting cupro compound can be any copper compound (cupric or cuprous), such as cupric oxide or cupric or cuprous carbonate, nitrate or sulfate, which will yield $Cu_2O$ when heated under the conditions under which the final metalizing composition is to be fired. Similarly, any vanadium compound, e.g., ammonium vanadate, which will yield $V_2O_5$ when heated under such conditions may be used. However, the preferred starting compounds are $Cu_2O$ and $V_2O_5$.

As indicated above, simple physical mixtures of $Cu_2O$ and $V_2O_5$ may be employed as such. However, since cohesive strength is distinctly superior when the $Cu_2O$ and $V_2O_5$ components, or their precursor compounds, are prereacted by fusion as described above, such fusion-reacted oxide compositions are preferred.

The copper/vanadium oxide compositions of the invention can be employed as the sole binding component of the noble metal metalizing compositions. However, because they spread so rapidly, they tend to spread over the noble metal surface of the metalized coating as well as over the ceramic substrate, so that when used as the sole binder they often lead to fired-on metal coatings whose surfaces must be "burnished" or abraded to remove the surface binder before the coating can be soldered. Burnishing to render the metalized coating solderable would constitute an extra step in production operations and, while not seriously objectionable, it would obviously be more desirable if solderable coatings could be obtained without the necessity of burnishing.

It has been found that excellent binders for noble metal compositions which can be fired on ceramic substrates to give metalized coatings that are directly solderable, can be readily formulated by simply mixing 30 to 70 parts of the present copper/vanadium oxide compositions with 70 to 30 parts by weight of a glass powder of the type of those of Table 1. It is important that the oxide composition and the glass powder be simply mixed together physically, since if the two are melted together or otherwise reacted into a single phase, most of the very desirably wetting characteristics of the present copper/vanadium oxide compositions is lost.

Examples 1 to 10 below shows various metalizing compositions containing the present copper/vanadium oxide compositions and formulated in accordance with the invention. The formulations include a vehicle, an 8% solution of ethyl cellulose (200 cps.) in beta-terpineol, in which the other components were uniformily dispersed to provide metalizing pastes. Other vehicles such as solutions of polyterpene resins in aliphatic petroleum naphthas or pine oil can be similarly employed. The gold powder used had an average particle size of about 3 microns, with 80% of the particles being of a size between 0.05 and 5 microns. The palladium powder used had an average particle size of about 0.5 micron, with 80% of the particles being of a size between 0.05 and 2 microns. The average particle size of the silver powder used was 0.2 micron with with 80% of the particles being of a size between 0.1 and 2 microns. The copper/vanadium oxide powders and the glass powders employed as binder components had average particle sizes ranging from 0.5 to 30 microns with 80% of the particles being of sizes of from 1 to 10 microns.

| Example | Components | Specific composition, percent | Suggested ranges, percent |
|---|---|---|---|
| 1 | Gold | 58.9 | 45–75 |
| | Platinum | 8.8 | 5–15 |
| | Comp. 4 of Tab. 2 | 7.5 | 5–30 |
| | Vehicle | 24.8 | 5–30 |
| 2 | Gold | 58.8 | 45–75 |
| | Platinum | 8.8 | 5–15 |
| | Comp. 4 of Tab. 2 | 3.8 | 2.2–21 |
| | Glass 1 of Tab. 1 | 3.8 | 2.2–21 |
| | Vehicle | 24.8 | 5–30 |
| 3 | Gold | 55.0 | 50–85 |
| | Palladium | 9.4 | 5–25 |
| | Comp. 3 of Tab. 2 | 10.5 | 5–30 |
| | Vehicle | 25.1 | 5–30 |
| 4 | Gold | 62.0 | 50–85 |
| | Palladium | 12.1 | 5–25 |
| | Comp. 3 of Tab. 2 | 3.0 | 2–21 |
| | Glass 2 of Tab. 1 | 7.0 | 2–21 |
| | Vehicle | 15.9 | 5–30 |
| 5 | Palladium | 66.4 | 50–80 |
| | Comp. 5 of Tab. 2 | 11.2 | 2–21 |
| | Vehicle | 22.4 | 5–30 |
| 6 | Palladium | 70.0 | 50–80 |
| | Comp. 6 of Tab. 2 | 7.5 | 2–21 |
| | Glass 3 of Tab. 1 | 7.5 | 2–21 |
| | Vehicle | 15.0 | 5–30 |
| 7 | Palladium | 22.0 | 5–40 |
| | Silver | 40.0 | 20–60 |
| | Comp. 4 of Tab. 2 | 10.2 | 2–21 |
| | Vehicle | 27.8 | 5–30 |
| 8 | Palladium | 22.0 | 5–40 |
| | Silver | 40.0 | 20–60 |
| | Comp. 2 of Tab. 2 | 7.5 | 2–21 |
| | Glass 4 of Tab. 1 | 7.5 | 2–21 |
| | Vehicle | 23.0 | 5–30 |
| 9 | Silver | 70.0 | 50–80 |
| | Comp. 5 of Tab. 2 | 12.0 | 2–21 |
| | Vehicle | 18.0 | 5–30 |
| 10 | Silver | 72.0 | 50–90 |
| | Comp. 4 of Tab. 2 | 7.0 | 2–21 |
| | Glass 8 of Tab. 1 | 5.0 | 2–21 |
| | Vehicle | 16.0 | 5–30 |

The metalizing compositions of the above examples and many similarly formulated compositions, when fired on alumina substrates, gave strongly adherent bonds to the substrate. Those such as Examples 1, 3, 5 7 and 9 which did not contain a glass powder component gave fired metal coatings which required burnishing before they could be soldered. In contrast, the remaining compositions, which contained a powdered glass, gave coatings which were directly solderable.

As indicated previously, $V_2O_5$ is effective as an additive in the absence of $Cu_2O$, provided the noble metal metalizing composition in which it is employed also includes a glass powder. In such cases, the fired composition, i.e., the metalizing, generally has a more metallic appearance and shows the beneficial effects of the $V_2O_5$ additive by its improved solderability, lower resistance and greater adhesion. Table 3 shows the improvements in these properties when $V_2O_5$ alone was added to typical metalizing compositions which also included a glass powder. The metalizing compositions indicated which included the $V_2O_5$ were those of Examples 11 to 15 below, which the "control" compositions whose metalizings were also tested for comparison were similar compositions except that $V_2O_5$ was omitted therefrom. Each of the metalizing compositions, with and without $V_2O_5$, was dispersed in a vehicle consisting of an 8% solution of ethyl cellulose (200 cps.) in beta-terpineol to give a metalizing paste consisting of about 82% metalizing composition and 18% vehicle. Similar procedures were followed in printing each paste on an alumina substrate, using the screen-stencil method, and in firing the resulting prints in air at about 750° C., to obtain the metalizings whose properties are reported in Table 3.

TABLE 3

| Type of composition | Solderability, Seconds | Adhesion, p.s.i. | Resistance, ohms/square |
|---|---|---|---|
| Pt-Au (control) | 20 | 1,200 | 0.050 |
| Pt-Au+$V_2O_5$ | 10 | 1,500 | 0.015 |
| Pd-Au (control) | 18 | 1,400 | 0.015 |
| Pd-Au+$V_2O_5$ | 11 | 1,800 | 0.021 |
| Pd (control) | 28 | 1,600 | 0.058 |
| Pd+$V_2O_5$ | 22 | 1,900 | 0.041 |
| Pd-Ag (control) | 12 | 2,200 | 0.025 |
| Pd-Ag+$V_2O_5$ | 8 | 2,700 | 0.020 |
| Ag (control) | 5 | 3,100 | 0.010 |
| Ag+$V_2O_5$ | 4 | 3,500 | 0.006 |

The reported solderabilities represent the number of seconds required to achieve a solder coating when the metalizing is dipped into a bath of molten solder (67% Sn, 33% Pb) maintained at 205–215° C. The reported adhesion values represent the pull in pounds per square in. (p.si.i.) required to "peel" a 0.025 in. diameter tinned-copper wire lead off the soldered metalizing at a rate of pull of 10 inches per minute. The resistance values reported were measured by a four point probe method using a Kelvin bridge. It is apparent from the values reported in Table 3 that the addition of $V_2O_5$ improved significantly the metalizings with respect to each of the three properties reported.

In the following Examples 11 to 15 and elsewhere herein, all percentages or proportions are by weight.

| Example | Components | Specific composition, percent | Suggested range, percent |
|---|---|---|---|
| 11 | Gold | 67.0 | 55–75 |
| | Platinum | 18.3 | 12–25 |
| | Glass 6 of Tab. 1 | 2.7 | 1–5 |
| | $Bi_2O_3$ | 10.9 | 6–14 |
| | $V_2O_5$ | 1.1 | 0.5–5 |
| 12 | Gold | 75.1 | 70–80 |
| | Palladium | 10.0 | 5–15 |
| | Glass 6 of Tab. 1 | 3.0 | 1–5 |
| | $Bi_2O_3$ | 10.6 | 8–14 |
| | $V_2O_5$ | 1.3 | 0.5–5 |
| 13 | Palladium | 86.1 | 80–90 |
| | Glass 6 of Tab. 1 | 8.0 | 6–10 |
| | $Bi_2O_3$ | 4.8 | 3–6 |
| | $V_2O_5$ | 1.1 | 0.5–5 |
| 14 | Palladium | 30.1 | 25–35 |
| | Silver | 54.6 | 50–60 |
| | Glass 6 of Tab. 1 | 3.1 | 1.5 |
| | $Bi_2O_3$ | 10.8 | 8–14 |
| | $V_2O_5$ | 1.4 | 0.5–5 |
| 15 | Silver | 85.4 | 75–90 |
| | Glass 5 of Tab. 1 | 4.9 | 1–6 |
| | $Bi_2O_3$ | 8.5 | 6–14 |
| | $V_2O_5$ | 1.2 | 0.5–5 |

In the above examples, all components were employed in powder form. The average particle sizes of the gold and platinum powders were 3 and 0.2 microns, respectively, with 80% of the particles being of a size between 0.05 and 5 microns. The palladium powder had an average particle size of about 0.3 micron with 80% of the particles being of a size between 0.1 and 1 micron. The silver powder had an average particle size of about 0.2 micron with 80% of the particles being of a size between 0.1 and 2 microns. The glass and $Bi_2O_3$ powders had an average particle size of about 5 microns with about 90% of the particles being of a size between 1 and 30 microns. The $V_2O_5$, C.P. grade, had an average particle size of about 5 microns with about 80% of the particles being of a size between 0.5 and 10 microns.

As shown by the preceding examples, the present $V_2O_5$ additives improve significantly all of the more common noble metal metalizing compositions, i.e., gold-platinum, gold-palladium, palladium, palladium-silver and silver compositions. Their improvement of the gold-platinum and gold-palladium compositions is particularly significant and worthwhile since such compositions, without the additive, compared with palladium, palladium-silver and silver compositions give metalizing which are rather poorly adherent to ceramic substrates. Furthermore, the improvements resulting from the $V_2O_5$ additives in the solderability and conductivity properties are greatest for the metalizings from the gold-platinum and gold-palladium compositions. Such metalizings generally tend to fissure and the improved ease with which they can be soldered with the solder going over and filling the fissures to improve conductivity as a result of the $V_2O_5$ additive is a significant and worthwhile improvement.

The above improvements in solderability and conductivity have been shown to be realized to a very worthwhile extent in metalizings from a large number of metalizing compositions composed of from 70–90% gold-platinum powders, 2–6% of a glass powder (63.1% CdO, 7.3% $Na_2O$, 16.9% $B_2O_3$ and 12.7% $SiO_2$), 3–23% $Bi_2O_3$ and 0.5 to 5% $V_2O_5$. In such compositions, the gold powder constituted from 78 to 83% of the combined weights of the gold and platinum powders present. The improvement in conductivity of the metalizings was especially outstanding and all compositions gave metalizings have acceptable adherence. Similar results were obtained from corresponding gold-palladium metalizing compositions.

Each of the various components of the present metalizing compositions should be employed in finely divided powder form and all should generally be of a particle size not exceeding about 40 microns in diameter. Noble metal powders of particle sizes ranging from about 0.1 to 10 microns are preferred, while inorganic binder powders and $V_2O_5$ additive powders (either $V_2O_5$ alone or a copper/vanadium oxide composition) or particle sizes ranging from about 1 to 15 microns are preferred.

As is commonly the case with noble metal/binder metalizing compositions, the present metalizing compositions will most generally be applied to the ceramic substrate upon which it is to be fired in the form of a dispersion of the composition in an inert organic vehicle. Such dispersions or paints can be applied to the substrate in any desired manner. Where application is to be made in a desired specific pattern, application can conveniently be made employing the well-known screen stencil technique by which delicate and exact prints of the metalizing composition can be readily applied. Such prints, e.g., after drying, if necessary or desirable, are fired, generally in air, at a suitable temperature which is sufficiently high to cause fusion of the binder but insufficiently high to cause fusion of the noble metal component. Firing will generally be effected at temperatures in the range 700 to 1400° C. for times of from 1.5 to 45 minutes or longer in either periodic or continuous belt type furnaces. The lower limit for the firing temperature is determined by the fusing temperature of the binder component, while the upper limit is determined by the melting temperature of the metal component.

Any of the organic vehicles commonly employed in preparing noble metal metalizing compositions, can be used in formulating the present noble metal/binder paints or pastes for application to ceramic substrates, the choice of vehicle being governed to some extent by the noble metal involved and by the use intended for the paint. Such vehicles should be inert towards the noble metal during formulation of the paint. They include the higher aliphatic alcohols (at least 8 carbons); esters of such alcohols, such as the acetates or propionates; the terpenes such as pine oil and the terpineols; aliphatic petroleum naphthas boiling at 150 to 320° C., and the like; and solutions of resins such as the polyterpene resins, the polymethacrylates of the lower alcohols, or ethyl cellulose, in solvents such as beta-terpineol, pine oil, the above naphthas and the alkyl ethers of ethylene glycol or diethylene glycol esters such as ethylene glycol monobutylether acetate (butyl—O—$CH_2$—$CH_2$—$OOCCH_3$) and diethylene glycol ethylether acetate (ethyl—O—$(CH_2)_2$—O—$(CH_2)_2$—$OOCCH_3$)

The vehicles may contain volatile liquids, such as kerosene, xylene, toluene, and the like, to promote fast drying or setting after application; or they may contain waxes, thermoplastic resins or the like materials which are thermofluid so that the composition may be applied at an elevated temperature to a relatively cold substrate upon which the composition sets immediately.

The proportions of the noble metal/binder composition to vehicle may be varied widely depending upon the manner in which the paint or paste is to be applied and the kind of vehicle used. Sufficient vehicle should be employed to give a paint or paste of the desired consistency. In general, from about 2 to 20 parts, preferably 3 to 6 parts, by weight of the metal/binder composition will be employed per 1 part by weight of the vehicle.

The embodiments of the invention in which an exclusive property or privilege is claimed are as follows:

1. A metalizing composition suitable to be applied to and fired on a ceramic substrate, said composition, on a weight basis, consisting essentially of 60 to 95% of a noble metal powder and 40 to 5% of a powdered oxide composition which consists essentially of 40 to 75% $Cu_2O$ and 60 to 25% $V_2O_5$.

2. A metalizing composition suitable to be applied to and fired on a ceramic substrate, said composition, on a weight basis, consisting essentially of 60 to 95% of a noble metal powder and 40 to 5% of a powdered fusion-reacted oxide composition consisting essentially of 40 to 75% $Cu_2O$ and 60 to 25% $V_2O_5$.

3. A metalizing composition suitable to be applied to and fired on a ceramic substrate, said composition, on a weight basis, consisting essentially of 60 to 95% of a noble metal powder and 40 to 5% of a binder mixture consisting essentially of 30 to 70% of the oxide composition of claim 1 and 70 to 30% of a borate glass powder.

4. A metalizing composition suitable to be applied to and fired on a ceramic substrate, said composition, on a weight basis, consisting essentially of 60 to 95% of a noble metal powder and 40 to 5% of a binder mixture consisting essentially of 30 to 70% of the oxide composition of claim 2 and 70 to 30% of a borate glass powder.

5. A noble metal composition suitable to be applied to and fired on a ceramic substrate, said composition, on a weight basis, consisting essentially of 60 to 95% of a noble metal powder and 40 to 5% of a binder mixture consisting essentially of 30 to 70% of the oxide composition of claim 2 and 70 to 30% of a borate glass powder, said oxide composition of claim 2 consisting essentially of about 54% $Cu_2O$ and 46% $V_2O_5$.

6. A metalizing composition according to claim 1 dispersed in an inert organic vehicle.

7. A metalizing composition according to claim 2 dispersed in an inert organic vehicle.

8. A metalizing composition according to claim 3 dispersed in an inert organic vehicle.

9. A metalizing composition according to claim 4 dispersed in an inert organic vehicle.

10. A metalizing composition according to claim 5 dispersed in an inert organic vehicle.

11. A conductor element comprising a ceramic substrate having fired thereon a layer of the metalizing composition of claim 1.

12. A conductor element comprising a ceramic substrate having fired thereon a layer of the metalizing composition of claim 2.

13. A conductor element comprising a ceramic substrate having fired thereon a layer of the metalizing composition of claim 3.

14. A conductor element comprising a ceramic substrate having fired thereon a layer of the metalizing composition of claim 4.

(References on following page)

References Cited

UNITED STATES PATENTS

| | | | |
|---|---|---|---|
| 2,733,161 | 1/1956 | Lytton et al. | 117—22 |
| 2,946,704 | 7/1960 | King et al. | 106—49 XR |
| 2,950,995 | 8/1960 | Place et al. | 252—514 XR |
| 2,950,996 | 8/1960 | Place et al. | 252—514 XR |
| 2,993,815 | 7/1961 | Treptow | 117—212 |
| 3,021,233 | 2/1962 | Fenity | 252—514 XR |
| 3,080,328 | 3/1963 | Billian | 252—512 |

OTHER REFERENCES

Hausner, "Semiconducting Ceramic Materials," J. Am. Ceramic Soc., vol. 30, #9, p. 292 (1947).

LEON D. ROSDOL, *Primary Examiner.*

J. D. WELSH, *Assistant Examiner.*

U.S. Cl. X.R.

252—518; 106—48, 1; 117—229, 227